United States Patent
Ichikawa

(10) Patent No.: US 7,847,432 B2
(45) Date of Patent: Dec. 7, 2010

(54) POWER SUPPLY SYSTEM AND VEHICLE

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 116 days.

(21) Appl. No.: 12/225,694

(22) PCT Filed: Apr. 16, 2007

(86) PCT No.: PCT/JP2007/058687

§ 371 (c)(1),
(2), (4) Date: Sep. 26, 2008

(87) PCT Pub. No.: WO2007/125840

PCT Pub. Date: Nov. 8, 2007

(65) Prior Publication Data

US 2009/0273235 A1    Nov. 5, 2009

(30) Foreign Application Priority Data

Apr. 24, 2006   (JP) .............................. 2006-119300

(51) Int. Cl.
*B60L 1/00* (2006.01)
(52) U.S. Cl. .......................... 307/45; 290/40; 307/9.1; 307/81; 307/82
(58) Field of Classification Search ........................ None
See application file for complete search history.

(56) References Cited

U.S. PATENT DOCUMENTS

| | | | |
|---|---|---|---|
| 6,566,846 B1 * | 5/2003 | Voo | ............................ 323/267 |
| 6,608,396 B2 | 8/2003 | Downer et al. | |
| 2003/0107352 A1 | 6/2003 | Downer et al. | |

FOREIGN PATENT DOCUMENTS

| | | |
|---|---|---|
| JP | A-11-155233 | 6/1999 |
| JP | A-2001-197732 | 7/2001 |
| JP | A-2002-010502 | 1/2002 |
| JP | A-2003-209969 | 7/2003 |
| JP | A-2003-309997 | 10/2003 |
| JP | A-2003-324989 | 11/2003 |
| JP | A-2004-015866 | 1/2004 |

OTHER PUBLICATIONS

Di Napoli, Multiple-Input DC-DC Power Converter for Power-Flow Management in Hybrid Vehicles, 2002, IEEE 0-7803-7310-7/02, p. 1578-1585.*

* cited by examiner

*Primary Examiner*—Jared J Fureman
*Assistant Examiner*—Justen Fauth
(74) *Attorney, Agent, or Firm*—Oliff & Berridge, PLC

(57) ABSTRACT

Transfer functions of control have duty commands as inputs and battery current values as outputs, provided corresponding to respected converters. Control gains are determined such that certain transfer functions substantially match with each other, with respect to delay elements.

20 Claims, 9 Drawing Sheets

POWER SUPPLY SYSTEM AND VEHICLE

TECHNICAL FIELD

The present invention relates to a power supply system including a plurality of power storage units and a vehicle equipped with the vehicle system. In particular, the present invention relates to a technique suppressing a circulation current caused between power storage units.

BACKGROUND ART

In recent years, considering environmental issues, attention has been paid to a vehicle employing an electric motor as a source of drive force, such as an electric vehicle, a hybrid vehicle, and a fuel cell vehicle. Such a vehicle is equipped with a power storage unit implemented for example by a rechargeable battery for supplying electric power to the electric motor and converting kinetic energy to electric energy during regenerative braking.

In such a vehicle employing an electric motor as a source of drive force, it is desirable to further increase a battery capacity of a power storage unit to improve acceleration performance and running performance such as a maximum traveling distance. As a method for increasing a battery capacity of a power storage unit, a configuration equipped with a plurality of power storage units has been proposed.

For example, U.S. Pat. No. 6,608,396 discloses an electric motor power management system providing a high-voltage vehicle traction system with a desired high direct current (DC) voltage level. The electric motor power management system includes a plurality of power stages connected in parallel and each having a battery and a boost/buck DC-DC converter for supplying DC power to at least one inverter, and a controller controlling the plurality of power stages such that the plurality of power stages can maintain a voltage output to the at least one inverter by uniformly charging/discharging the batteries of the plurality of power stages.

In the electric motor power management system disclosed in U.S. Pat. No. 6,608,396, it is disclosed that each battery is actively maintained to be in the same SOC (State of Charge) as that of other batteries in the system. To implement such a configuration, the batteries are required to have the same battery capacity.

Meanwhile, to increase a battery capacity, it is important to make good use of a space such as in a vehicle interior, and providing a plurality of power storage units having battery capacities different from each other depending on a space is also under consideration. When a plurality of power storage units having battery capacities different from each other are provided as described above, it is desirable to provide a voltage conversion unit having voltage conversion capability (such as allowable conversion power, an allowable conversion current value, and a voltage conversion possible range) suitable for the battery capacity (or charge/discharge current) of each power storage unit, to reduce loss due to voltage conversion.

Such voltage conversion units having voltage conversion capabilities different from each other inevitably have different response characteristics, due to differences in inductance and the like. Therefore, if the electric motor power management system disclosed in U.S. Pat. No. 6,608,396 is directly applied, a voltage difference may be caused between the voltage conversion units during transition such as immediately after system start-up, and an unwanted circulation current may flow between the power storage units through the voltage conversion units. Such a circulation current may damage the power storage units.

DISCLOSURE OF THE INVENTION

The present invention has been made to solve such a problem, and one object of the present invention is to provide a power supply system and a vehicle suppressing an unwanted circulation current caused between a plurality of voltage conversion units having voltage conversion capabilities different from each other, and avoiding damage to power storage units.

A power supply system in accordance with one aspect of the present invention has a plurality of power storage units each configured to be chargeable/dischargeable, and includes a power line configured to allow supply/reception of electric power between a load device and the power supply system, and a plurality of voltage conversion units provided between the plurality of power storage units and the power line, respectively, and each performing voltage conversion operation between the corresponding power storage unit and the power line. At least one of the plurality of voltage conversion units has voltage conversion capability different from that of other of the plurality of voltage conversion units. Each of the plurality of voltage conversion units is controlled by a control system including a first feedback unit performing the voltage conversion operation such that a current value or voltage value generated by the voltage conversion operation matches a prescribed reference value. A control gain in the first feedback unit is determined such that time taken from when a standard reference value is applied to the first feedback unit to when a current value or voltage value generated by the voltage conversion operation in the corresponding voltage conversion unit reaches a standard output value substantially matches time taken from when the standard reference value is applied to another first feedback unit to when a current value or voltage value generated by the voltage conversion operation in corresponding another voltage conversion unit reaches the standard output value.

According to the power supply system in accordance with this aspect, the control gain in the first feedback unit is determined such that time taken from when a standard reference value is applied to the first feedback unit to when a current value or voltage value generated by the voltage conversion operation in the corresponding voltage conversion unit reaches a standard output value substantially matches time taken from when the standard reference value is applied to another first feedback unit to when a current value or voltage value generated by the voltage conversion operation in corresponding another voltage conversion unit reaches the standard output value. Thereby, the first feedback unit determining a response characteristic of the corresponding voltage conversion unit during transition is implemented to compensate for a difference in the response characteristics of the voltage conversion units, and thus response characteristics of outputs of the voltage conversion units substantially match with each other. Therefore, generation of a voltage difference between the voltage conversion units during transition such as immediately after the start of control can be avoided, suppressing a circulation current between the power storage units flowing through the voltage conversion units.

Preferably, the control gain in the first feedback unit is determined such that a transfer function including the first feedback unit and the corresponding voltage conversion unit substantially matches a transfer function including another first feedback unit and corresponding another voltage conversion unit, with respect to delay elements.

Preferably, the power supply system further includes a battery current value detection unit detecting a battery current value of each of the plurality of power storage units, and each of the plurality of voltage conversion units is controlled such that the battery current value of the corresponding power storage unit matches a reference current value.

Preferably, the power supply system further includes a supply voltage value detection unit detecting a voltage value on the power line, and the reference current value is determined by a second feedback unit that sets the voltage conversion operation such that the voltage value on the power line detected by the supply voltage value detection unit matches a reference voltage value.

More preferably, the control system for controlling each of the plurality of voltage conversion units includes a voltage feedforward unit causing a value corresponding to a ratio between a battery voltage value of the corresponding power storage unit and the reference voltage value to be reflected in an output of the first feedback unit.

Preferably, the power supply system further includes a supply voltage value detection unit detecting a voltage value on the power line, and each of the plurality of voltage conversion units is controlled such that the voltage value on the power line detected by the supply voltage value detection unit matches a reference voltage value.

More preferably, the control system for controlling each of the plurality of voltage conversion units includes a voltage feedforward unit causing a value corresponding to a ratio between a battery voltage value of the corresponding power storage unit and the reference voltage value to be reflected in an output of the first feedback unit.

Preferably, each of the plurality of voltage conversion units includes a chopper circuit.

A vehicle in accordance with another aspect of the present invention includes a power supply system having a plurality of power storage units each configured to be chargeable/dischargeable, and a drive force generation unit receiving electric power supplied from the power supply system to generate drive force. The power supply system includes a power line configured to allow supply/reception of electric power between the drive force generation unit and the power supply system, and a plurality of voltage conversion units provided between the plurality of power storage units and the power line, respectively, and each performing voltage conversion operation between the corresponding power storage unit and the power line. At least one of the plurality of voltage conversion units has voltage conversion capability different from that of other of the plurality of voltage conversion units. Each of the plurality of voltage conversion units is controlled by a control system including a first feedback unit performing the voltage conversion operation such that a current value or voltage value generated by the voltage conversion operation matches a prescribed reference value. A control gain in the first feedback unit is determined such that time taken from when a standard reference value is applied to the first feedback unit to when a current value or voltage value generated by the voltage conversion operation in the corresponding voltage conversion unit reaches a standard output value substantially matches time taken from when the standard reference value is applied to another first feedback unit to when a current value or voltage value generated by the voltage conversion operation in corresponding another voltage conversion unit reaches the standard output value.

According to the vehicle in accordance with this aspect, the control gain in the first feedback unit is determined such that time taken from when a standard reference value is applied to the first feedback unit to when a current value or voltage value generated by the voltage conversion operation in the corresponding voltage conversion unit reaches a standard output value substantially matches time taken from when the standard reference value is applied to another first feedback unit to when a current value or voltage value generated by the voltage conversion operation in corresponding another voltage conversion unit reaches the standard output value. Thereby, the first feedback unit determining a response characteristic of the corresponding voltage conversion unit during transition is implemented to compensate for a difference in the response characteristics of the voltage conversion units, and thus response characteristics of outputs of the voltage conversion units substantially match with each other. Therefore, generation of a voltage difference between the voltage conversion units during transition such as immediately after the start of control can be avoided, suppressing a circulation current between the power storage units flowing through the voltage conversion units.

Preferably, the drive force generation unit includes at least one power conversion unit configured to be capable of converting the electric power supplied from the power supply system, and at least one electric rotating machine connected to the corresponding power conversion unit and configured to be capable of generating the drive force.

Preferably, the control gain in the first feedback unit is determined such that a transfer function including the first feedback unit and the corresponding voltage conversion unit substantially matches a transfer function including another first feedback unit and corresponding another voltage conversion unit, with respect to delay elements.

Preferably, the power supply system further includes a battery current value detection unit detecting a battery current value of each of the plurality of power storage units, and each of the plurality of voltage conversion units is controlled such that the battery current value of the corresponding power storage unit matches a reference current value.

Preferably, the power supply system further includes a supply voltage value detection unit detecting a voltage value on the power line, and the reference current value is determined by a second feedback unit that sets the voltage conversion operation such that the voltage value on the power line detected by the supply voltage value detection unit matches a reference voltage value.

More preferably, the control system for controlling each of the plurality of voltage conversion units includes a voltage feedforward unit causing a value corresponding to a ratio between a battery voltage value of the corresponding power storage unit and the reference voltage value to be reflected in an output of the first feedback unit.

Preferably, the power supply system further includes a supply voltage value detection unit detecting a voltage value on the power line, and each of the plurality of voltage conversion units is controlled such that the voltage value on the power line detected by the supply voltage value detection unit matches a reference voltage value.

More preferably, the control system for controlling each of the plurality of voltage conversion units includes a voltage feedforward unit causing a value corresponding to a ratio between a battery voltage value of the corresponding power storage unit and the reference voltage value to be reflected in an output of the first feedback unit.

Preferably, each of the plurality of voltage conversion units includes a chopper circuit.

According to the present invention, a power supply system and a vehicle suppressing an unwanted circulation current caused between a plurality of voltage conversion units having voltage conversion capabilities different from each other, and avoiding damage to power storage units can be implemented.

BEST MODES FOR CARRYING OUT THE INVENTION

Figure 1:
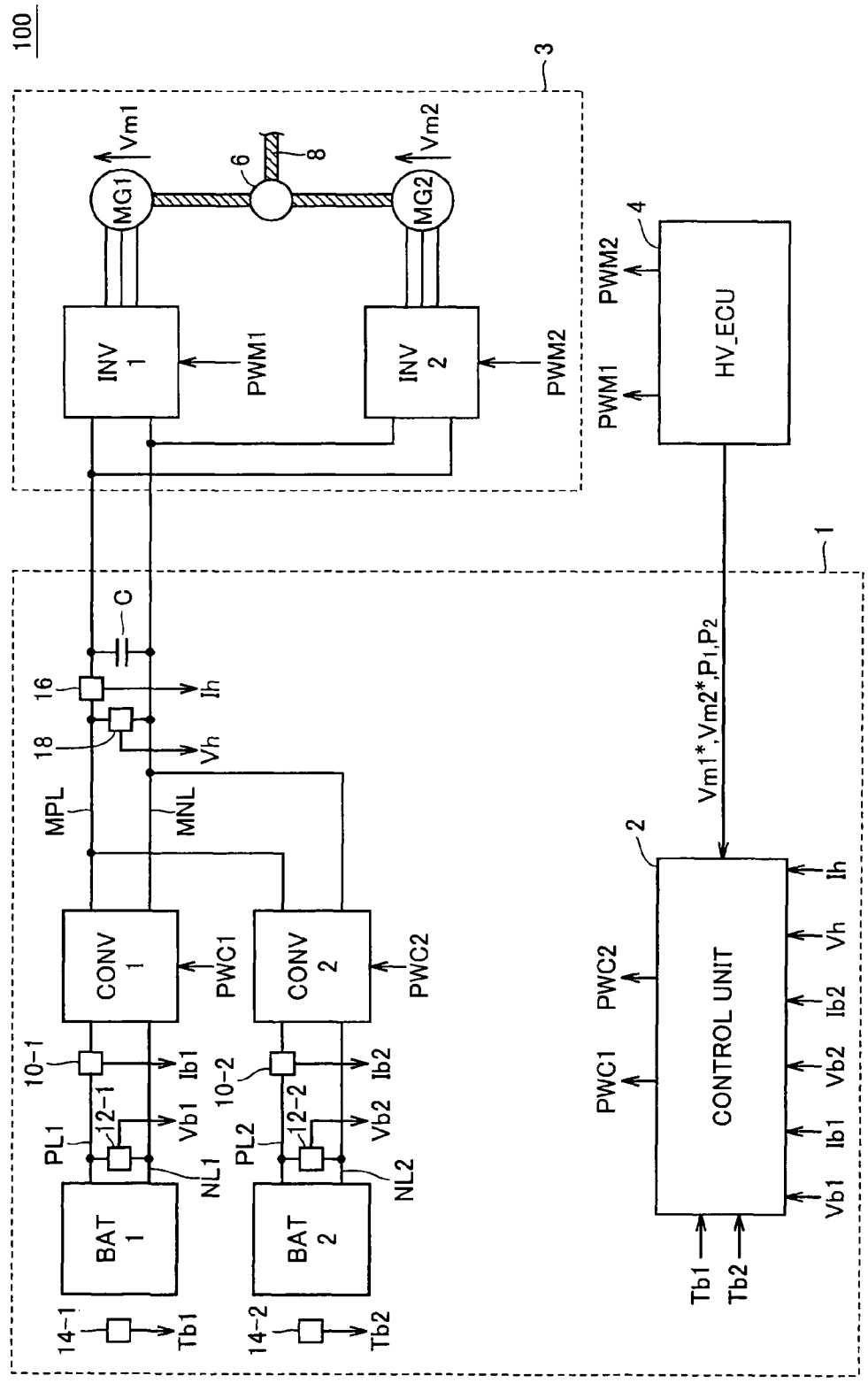
FIG. 1 is a schematic configuration diagram showing a substantial part of a vehicle including a power supply system in accordance with a first embodiment of the present invention.

Embodiments of the present invention will now be described in detail with reference to the drawings, in which identical or corresponding parts will be designated by the same reference numerals, and the description thereof will not be repeated.

First Embodiment

Referring to FIG. 1, a vehicle 100 including a power supply system 1 in accordance with a first embodiment of the present invention will be described. The first embodiment illustrates a case where a drive force generation unit 3 generating drive force for vehicle 100 is used as an example of a load device. Drive force generation unit 3 receives electric power from power supply system 1 to generate drive force, and supplies the drive force to wheels (not shown) of vehicle 100, causing vehicle 100 to run.

In the first embodiment, power supply system 1 having two power storage units as an example of a plurality of power storage units will be described. Power supply system 1 supplies and receives DC power to and from drive force generation unit 3 through a main positive bus line MPL and a main negative bus line MNL.

Drive force generation unit 3 includes a first inverter INV1, a second inverter INV2, a first motor-generator MG1, and a second motor-generator MG2, and generates drive force in response to switching commands PWM1, PWM2 from a HV_ECU (Hybrid Vehicle Electronic Control Unit) 4.

Inverters INV1, INV2 are connected in parallel to main positive bus line MPL and main negative bus line MNL, and supply and receive electric power to and from power supply system 1. Specifically, inverters INV1, INV2 convert DC power received through main positive bus line MPL and main negative bus line MN1 into alternate current (AC) power, and supply the AC power to motor-generators MG1, MG2, respectively. Further, inverters INV1, INV2 may be configured to convert AC power, generated by motor-generators MG1, MG2 receiving kinetic energy of vehicle 100 during regenerative braking of vehicle 100 or the like, into DC power and supply the DC power to power supply system 1 as regenerative power. For example, inverters INV1, INV2 are formed of a bridge circuit including switching elements for three phases, and generate three-phase AC power by performing switching (circuit opening/closing) operation in response to respective switching commands PWM1, PWM2 received from HV_ECU 4.

Motor-generators MG1, MG2 are configured to be capable of generating rotational drive force by receiving AC power supplied from inverters INV1, INV2, respectively, and generating AC power by receiving external rotational drive force. For example, motor-generators MG1, MG2 are a three-phase AC electric rotating machine including a rotor having permanent magnets embedded therein. Motor-generators MG1, MG2 are coupled to a motive power transfer mechanism 6 to transfer the generated drive force to the wheels (not shown) via a drive shaft 8.

If drive force generation unit 3 is applied to a hybrid vehicle, motor-generators MG1, MG2 are also coupled to an engine (not shown) via motive power transfer mechanism 6 or drive shaft 8. Then, HV_ECU 4 performs control to obtain an optimal ratio between the drive force generated by the engine and the drive force generated by motor-generators MG1, MG2. If drive force generation unit 3 is applied to such a hybrid vehicle, motor-generator MG1 may serve exclusively as an electric motor, and motor-generator MG2 may serve exclusively as a generator.

HV_ECU 4 executes a program stored in advance to calculate torque reference values and rotation speed reference values of motor-generators MG1, MG2, based on a signal transmitted from each sensor (not shown), a running situation, variation in an accelerator pedal position, a stored map, and the like. Then, HV_ECU 4 generates switching commands PWM1, PWM2 and supplies the commands to drive force generation unit 3 such that generated torques and rotation speeds of motor-generators MG1, MG2 match the calculated torque reference values and rotation speed reference values.

In addition, HV_ECU 4 obtains counter electromotive voltage values Vm1, Vm2 generated in motor-generators MG1, MG2, respectively, based on the calculated torque reference values and rotation speed reference values, or torque actual values and rotation speed actual values detected by various sensors (not shown), and outputs to power supply system 1 required voltage values Vm1*, Vm2* determined based on counter electromotive voltage values Vm1, Vm2. Specifically, HV_ECU 4 determines voltage values higher than counter electromotive voltage values Vm1, Vm2 as required voltage values Vm1*, Vm2* such that power supply system 1 can supply electric power to motor-generators MG1, MG2.

Further, HV_ECU 4 obtains electric power actual values P1, P2 based on the products of the torque reference values and the rotation speed reference values, or the products of the torque actual values and the rotation speed actual values, and outputs electric power actual values P1, P2 to power supply system 1. It is to be noted that HV_ECU 4 informs power supply system 1 of the electric power supply/reception state in drive force generation unit 3 by changing the signs of electric power actual values P1, P2, for example, such that electric power consumption is represented by a positive value and electric power generation is represented by a negative value.

On the other hand, power supply system 1 includes a smoothing capacitor C, a supply current value detection unit 16, a supply voltage value detection unit 18, a first converter CONV1, a second converter CONV2, a first power storage unit BAT1, a second power storage unit BAT2, battery current value detection units 10-1, 10-2, battery voltage value detection units 12-1, 12-2, battery temperature detection units 14-1, 14-2, and a control unit 2.

Smoothing capacitor C is connected between main positive bus line MPL and main negative bus line MNL, and reduces a fluctuation component contained in electric power supplied from converters CONV1, CONV2.

Supply current value detection unit 16 is disposed in main positive bus line MPL in series, detects a supply current value Ih of electric power supplied to drive force generation unit 3, and outputs the detection result to control unit 2.

Supply voltage value detection unit 18 is connected between main positive bus line MPL and main negative bus line MNL, detects a supply voltage value Vh of the electric power supplied to drive force generation unit 3, and outputs the detection result to control unit 2.

Converters CONV1, CONV2 are connected in parallel to main positive bus line MPL and main negative bus line MNL, and perform voltage conversion operation between corresponding power storage units BAT1, BAT2 and main positive bus line MPL and main negative bus line MNL. More specifically, converters CONV1, CONV2 boost discharge power from power storage units BAT1, BAT2 up to a reference voltage value, respectively, to generate supply power. For example, converters CONV1, CONV2 are configured to include a chopper circuit, and their voltage conversion capabilities (such as allowable conversion power, an allowable conversion current value, and a voltage conversion possible range) are designed in accordance with battery capacities of power storage units BAT1, BAT2, respectively. Specifically, capacity of an inductor, a rated current value of a transistor, and the like are optimized.

Power storage units BAT1, BAT2 are connected in parallel to main positive bus line MPL and main negative bus line MNL through converters CONV1, CONV2, respectively. For example, power storage units BAT1, BAT2 are implemented by a rechargeable battery configured to be chargeable/dischargeable, such as a nickel hydride battery or a lithium ion battery. In particular, in the first embodiment of the present invention, power storage units BAT1, BAT2 have battery capacities different from each other.

Battery current value detection units 10-1, 10-2 are disposed in power lines connecting power storage units BAT1, BAT2 to converters CONV1, CONV2, respectively, detect battery current values Ib1, Ib2 related to input/output of power storage units BAT1, BAT2, respectively, and output the detection result to control unit 2.

Battery voltage value detection units 12-1, 12-2 are connected between power lines connecting power storage units BAT1, BAT2 to converters CONV1, CONV2, respectively, detect battery voltage values Vb1, Vb2 of power storage units BAT1, BAT2, respectively, and output the detection result to control unit 2.

Battery temperature detection units 14-1, 14-2 are arranged in the proximity of battery cells or the like constituting power storage units BAT1, BAT2, respectively, detect battery temperatures Tb1, Tb2 representing internal temperatures of power storage units BAT1, BAT2, respectively, and output the detection result to control unit 2. It is to be noted that battery temperature detection units 14-1, 14-2 may also be configured to output representative values obtained for example by averaging processing, based on the result of detection by a plurality of detection elements arranged in correspondence with a plurality of battery cells constituting power storage units BAT1, BAT2, respectively.

Control unit 2 generates switching commands PWC1, PWC2 in accordance with a control structure described later, based on required voltage values Vm1*, Vm2* and electric power actual values P1, P2 received from HV_ECU 4, supply current value Ih received from supply current value detection unit 16, supply voltage value Vh received from supply voltage value detection unit 18, battery current values Ib1, Ib2 received from battery current value detection units 10-1, 10-2, battery voltage values Vb1, Vb2 received from battery voltage value detection units 12-1, 12-2, and battery temperatures Tb1, Tb2 received from battery temperature detection units 14-1, 14-2, respectively, and controls the voltage conversion operation of converters CONV1, CONV2, respectively.

More specifically, control unit 2 generates duty commands Ton1, Ton2 by a control system including a voltage feedback unit (main loop) setting the voltage conversion operation such that supply voltage value Vh, which is one of process values, matches a reference voltage value Vh*, and two current feedback units (minor loops) causing the voltage conversion operation to be performed such that battery current values Ib1, Ib2 match current reference values Ib1*, Ib2*, respectively. Herein, reference voltage value Vh* is determined in accordance with required voltage values Vm1*, Vm2* received from HV_ECU 4. Further, the voltage feedback unit and the current feedback units constitute cascade control, and current reference values Ib1*, Ib2* are each determined by the result of computation from the voltage feedback unit.

These two current feedback units are each configured to include a proportional element (P) and an integral element (I). A proportional gain Kp and an integral gain Ti, which are control gains of the elements, are determined such that, in each of the current feedback units, it takes substantially the same amount of time from when a standard reference value (current reference value) is supplied to each current feedback unit to when a battery current value generated by the voltage conversion operation in the corresponding one of converters CONV1, CONV2 reaches a standard output value. To give a concrete example, proportional gain Kp and integral gain Ti serving as the control gains of the elements are determined such that a transfer function including one of the current feedback units and corresponding converter CONV1 substantially matches a transfer function including the other of the current feedback units and corresponding converter CONV2, with respect to delay elements.

Further, the control system described above is configured to include voltage feedforward units adding values corresponding to ratios between reference voltage value Vh* and battery voltage values Vb1, Vb2 of power storage units BAT1, BAT2, respectively (voltage conversion ratios).

Since the control gains in the two current feedback units controlling battery current values Ib1, Ib2 of power storage units BAT1, BAT2, respectively, are determined including response characteristics (transfer functions) of converters CONV1, CONV2 that are subject processes, an unwanted circulation current can be suppressed even if converters CONV1, CONV2 have voltage conversion capabilities different from each other.

As to the correspondence between FIG. 1 and the invention of the present application, drive force generation unit 3 corresponds to the "load device", main positive bus line MPL and main negative bus line MNL correspond to the "power line", and converters CONV1, CONV2 correspond to the "plurality of voltage conversion units." Further, battery current value detection units 10-1, 10-2 correspond to the "battery current value detection unit", supply voltage value detection unit 18 corresponds to the "supply voltage value detection unit", and battery voltage value detection units 12-1, 12-2 correspond to the "battery voltage value detection unit".

Figure 2:
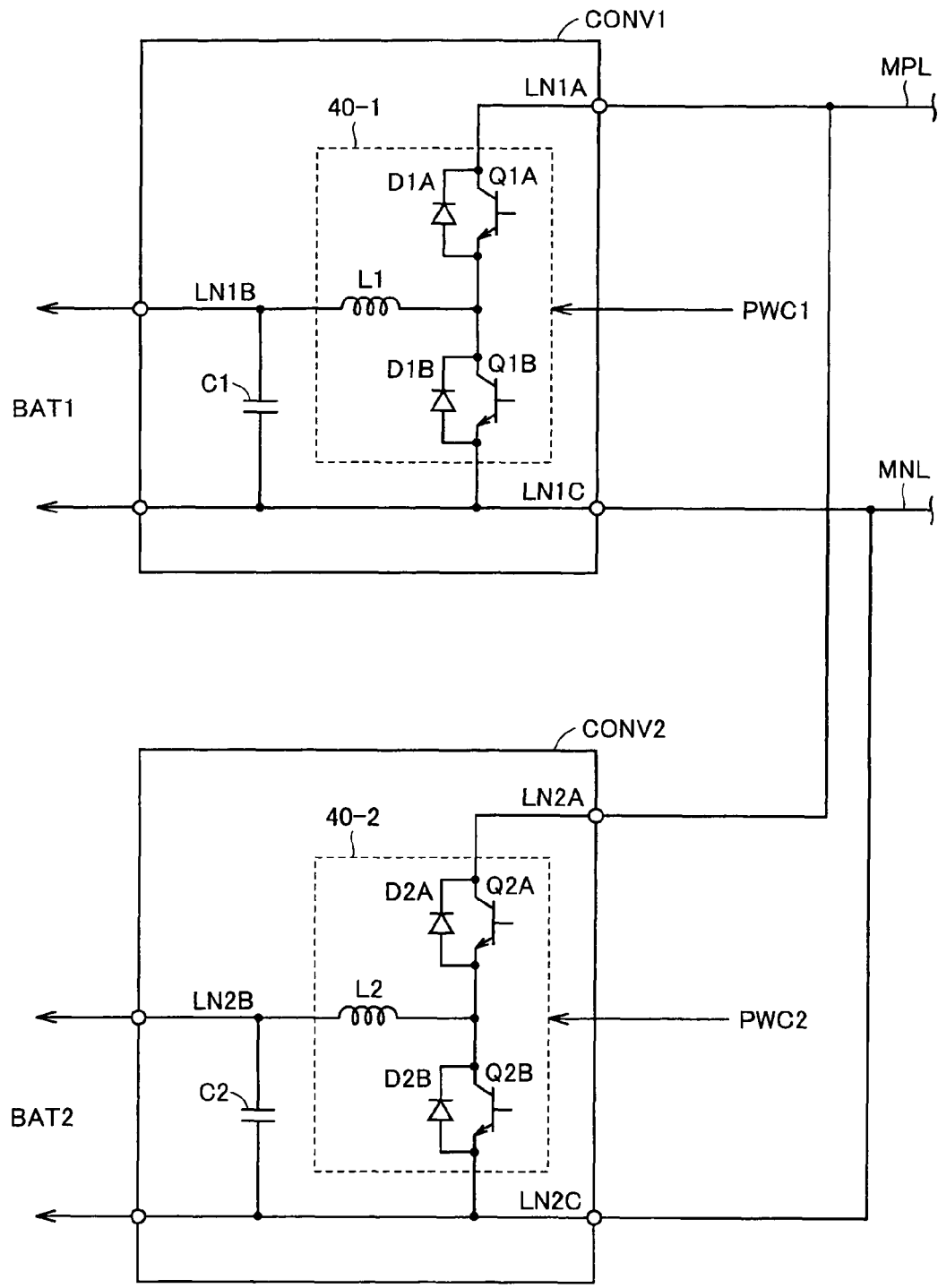
FIG. 2 is a schematic configuration diagram of a converter in accordance with the first embodiment of the present invention.

Referring to FIG. 2, converters CONV1, CONV2 in accordance with the first embodiment of the present invention will be described. Converter CONV1 includes a chopper circuit 40-1 and a smoothing capacitor C1.

Chopper circuit 40-1 can supply electric power bidirectionally. Specifically, chopper circuit 40-1 can boost discharge power from power storage unit BAT1 in response to switching command PWC1 from control unit 2 (FIG. 1) to supply the boosted discharge power to drive force generation unit 3 (FIG. 1), and can buck regenerative power received from drive force generation unit 3 to supply the bucked regenerative power to power storage unit BAT1. Chopper circuit 40-1 includes a positive bus line LN1A, a negative bus line LN1C, a line LN1B, transistors Q1A, Q1B serving as switching elements, diodes D1A, D1B, and an inductor L1.

Positive bus line LN1A has one end connected to a collector of transistor Q1A and the other end connected to main positive bus line MPL. Negative bus line LN1C has one end connected to the negative side of power storage unit BAT1 and the other end connected to main negative bus line MNL.

Transistors Q1A and Q1B are connected in series between positive bus line LN1A and negative bus line LN1C. The collector of transistor Q1A is connected to positive bus line LN1A, and an emitter of transistor Q1B is connected to negative bus line LN1C. Diodes D1A, D1B allowing current to flow from the emitter side to the collector side are connected between the collector and the emitter of transistors Q1A, Q1B, respectively. Further, inductor L1 is connected to a connection point of transistor Q1A and transistor Q1B.

Line LN1B has one end connected to the positive side of power storage unit BAT1 and the other end connected to inductor L1.

Smoothing capacitor C1 is connected between line LN1B and negative bus line LN1C, and reduces AC component contained in DC voltage between line LN1B and negative bus line LN1C.

Hereinafter, the voltage conversion operation of converter CONV1 will be described. In boost operation, control unit 2 (FIG. 1) maintains transistor Q1A in an ON state, and turns on/off transistor Q1B at a prescribed duty ratio. During an ON period of transistor Q1B, a discharge current flows from power storage unit BAT1 to main positive bus line MPL, sequentially through line LN1B, inductor L1, transistor Q1A, and positive bus line LN1A. At the same time, a pump current flows from power storage unit BAT1, sequentially through line LN1B, inductor L1, transistor Q1B, and negative bus line LN1C. Inductor L1 accumulates electromagnetic energy by means of the pump current. Subsequently, when transistor Q1B makes transition from an ON state to an OFF state, inductor L1 superimposes the accumulated electromagnetic energy onto the discharge current. As a result, an average voltage of DC power supplied from converter CONV1 to main positive bus line MPL and main negative bus line MNL is boosted by a voltage corresponding to the electromagnetic energy accumulated in inductor L1 in accordance with the duty ratio.

Since the configuration and the operation of converter CONV2 are also similar to those of converter CONV1 described above, the detailed description thereof will not be repeated.

As described above, the voltage conversion (boosting) capabilities of converters CONV1, CONV2 are determined in accordance with electromagnetic energies stored in inductors L1, L2 by a switching operation. Accordingly, amounts of inductors L1, L2 (inductances) and a switching period are optimally designed in accordance with the battery capacities of power storage units BAT1, BAT2. Further, allowable current values flowing through transistors Q1A, Q1B, Q2A, Q2B are also optimally designed in accordance with the battery capacities (or charge/discharge electric powers) of power storage units BAT1, BAT2. Therefore, when power storage units BAT1, BAT2 have different battery capacities, the elements contained in converters CONV1, CONV2 inevitably have different physical constants, and have different response characteristics. It is to be noted that the response characteristic referred to herein has a generic meaning including a temporal change in process values (such as battery current values Ib1, Ib2 and supply voltage value Vh) that occurs as a result of the voltage conversion operation of converters CONV1, CONV2 when a standard command is applied to converters CONV1, CONV2 that are the subject processes.

Figure 3A:
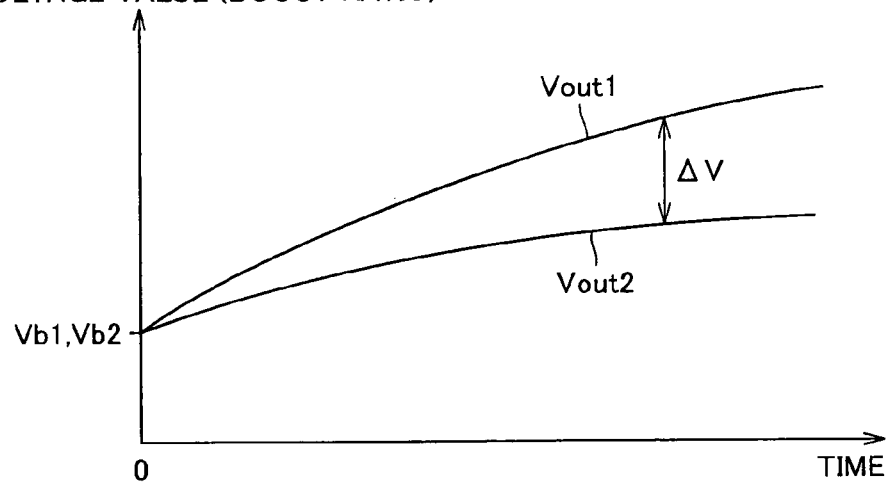
FIGS. 3A and 3B are views for illustrating a circulation current caused between power storage units when voltage conversion operation is started.
Figure 3B:
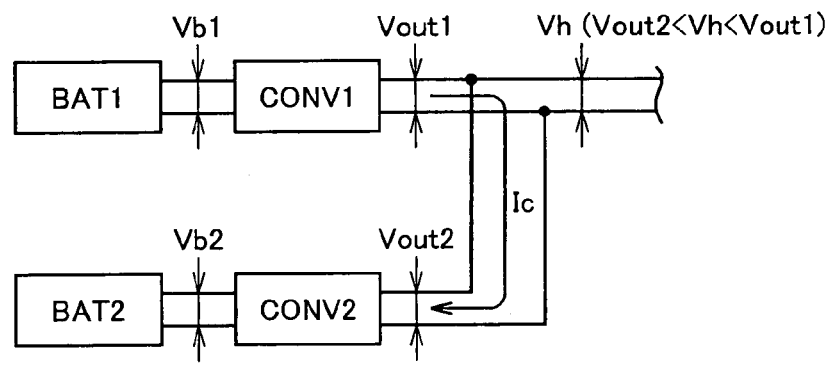

Referring to FIGS. 3A and 3B, a circulation current caused between power storage units BAT1 and BAT2 when the voltage conversion operation is started will be described. FIG. 3A shows temporal changes in output voltage values Vout1, Vout2 from converters CONV1, CONV2 immediately after the start of the voltage conversion operations. FIG. 3B shows an outline of the circulation current caused between power storage units BAT1 and BAT2.

When control unit 2 receives an ignition-on signal (not shown) for example, it starts generating duty commands Ton1, Ton2 according to a predetermined control computing equation. As described above, when inductors L1, L2 contained in converters CONV1, CONV2 have different amounts, they have different electromagnetic energies stored in each switching cycle to be used for the voltage conversion operation (boosting). Therefore, in a transition state, as shown in FIG. 3A, the temporal change in output voltage value Vout1 of converter CONV1 does not match that in output voltage value Vout2 of converter CONV2.

For example, even if battery voltage values Vb1 and Vb2 of power storage units BAT1 and BAT2 are identical in an initial state, a voltage difference ΔV may occur transiently between the output voltages due to a difference in response characteristics (rise times) of output voltage values Vout1, Vout2 of converters CONV1, CONV2.

Referring to FIG. 3B, since converters CONV1, CONV2 are connected in parallel with each other, converter CONV1 generating a higher voltage supplies its output voltage value Vout1 to the load device (drive force generation unit 3), as supply voltage value Vh. At the same time, a circulation current Ic occurs between converters CONV1, CONV2 having voltage difference ΔV in the output voltage values thereof, from converter CONV1 to converter CONV2. Since circulation current Ic flows from power storage unit BAT1 to power storage unit BAT2, and a flow path has a small resistance value, circulation current Ic has a relatively large value even if voltage difference ΔV is relatively small. As a result, power storage units BAT1, BAT2 may be damaged.

Therefore, in the first embodiment of the present invention, the control gains in the two current feedback units related to battery current values Ib1, Ib2 are determined to suppress such circulation current Ic, taking the response characteristics of converters CONV1, CONV2 into consideration. Specifically, such circulation current Ic is suppressed by setting such that time taken from when a standard reference value (current reference value) is supplied to one of the current feedback units to when battery current value Ib1 generated by the voltage conversion operation in corresponding converter CONV1 reaches a standard output value (i.e., response time) is substantially identical to time taken from when the standard reference value (current reference value) is supplied to the other of the current feedback units to when battery current value Ib2 generated by the voltage conversion operation in corresponding converter CONV2 reaches the standard output value.

Figure 4:
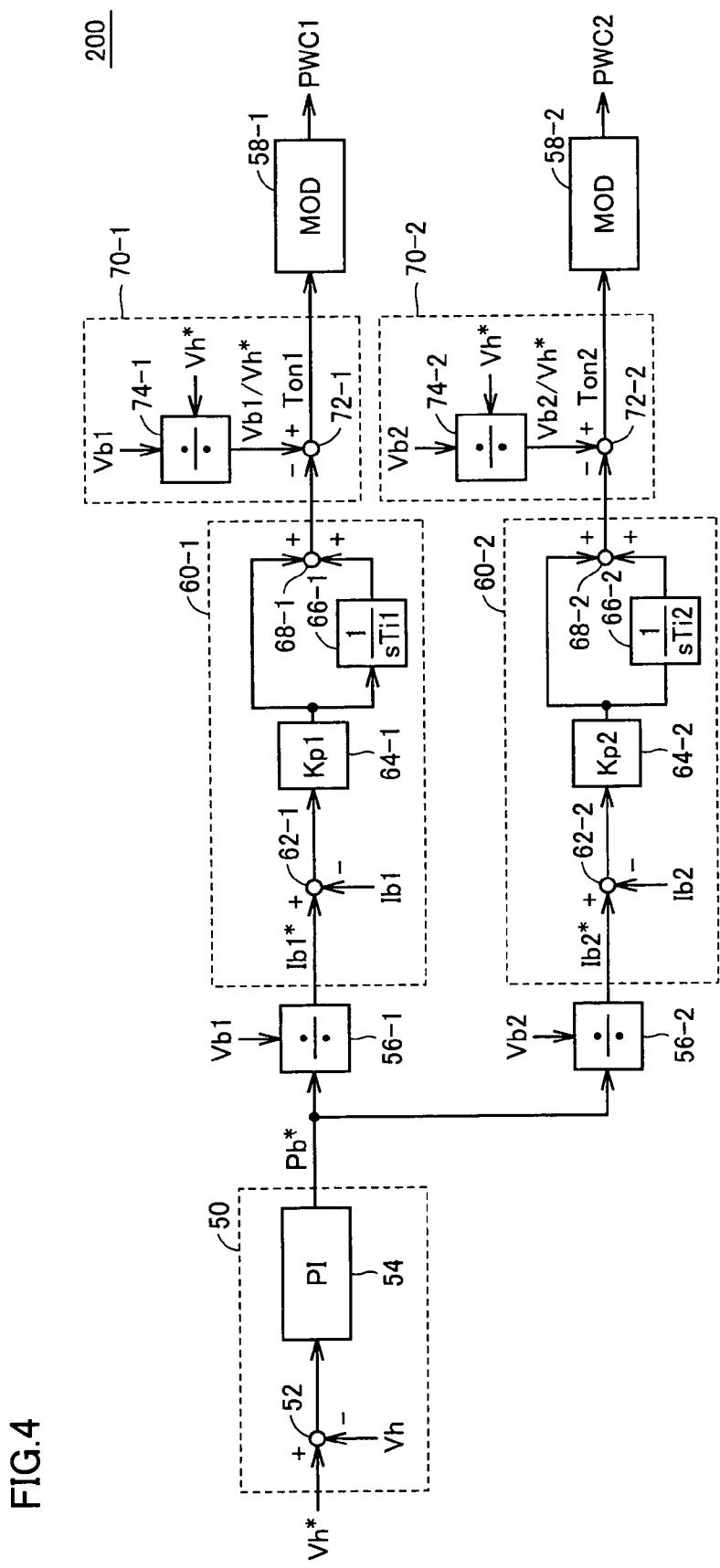
FIG. 4 is a view showing a control block for controlling the converter in accordance with the first embodiment of the present invention.

Referring to FIG. 4, a control block 200 for controlling converters CONV1, CONV2 in accordance with the first embodiment of the present invention will be described. Control block 200 includes a voltage feedback unit 50, division units 56-1, 56-2, current feedback units 60-1, 60-2, voltage feedforward units 70-1, 70-2, and modulation units (MOD) 58-1, 58-2.

Voltage feedback unit 50 receives reference voltage value Vh* and supply voltage value Vh, and supplies a control output corresponding to a voltage deviation therebetween such that supply voltage value Vh matches reference voltage value Vh*. Herein, voltage feedback unit 50 generates an electric power deviation by multiplying the voltage deviation by a prescribed constant, and outputs an electric power reference value Pb*, which is a reference value of the supply power of converters CONV1, CONV2, based on the generated electric power deviation. It is to be noted that reference voltage value Vh* is determined so as not fall below the maximum battery voltage value of battery voltage values Vb1, Vb2, i.e., such that the minimum value of reference voltage value Vh* is maintained at the maximum battery voltage value, to suppress a circulation current caused immediately after the start of the control due to a difference in the battery voltages of power storage units BAT1, BAT2.

Voltage feedback unit 50 includes a subtraction unit 52 and a proportional and integral unit (PI) 54. Subtraction unit 52 computes the voltage deviation based on a difference between reference voltage value Vh* and supply voltage value Vh, and outputs the voltage deviation to proportional and integral unit 54. Proportional and integral unit 54 is configured to include at least a proportional element (P) and an integral element (I), and outputs to division units 56-1, 56-2 the control output (electric power reference value Pb*) corresponding to the input voltage deviation.

Division units 56-1, 56-2 receive electric power reference value Pb* and divide electric power reference value Pb* by battery voltage values Vb1, Vb2 of power storage units BAT1, BAT2 to calculate current reference values Ib1*, Ib2*, respectively. Then, division units 56-1, 56-2 output the calculated current reference values Ib1*, Ib2* to current feedback units 60-1, 60-2, respectively.

Current feedback unit 60-1 receives current reference values Ib1* and battery current value Ib1, and supplies a control output corresponding to a current deviation therebetween such that battery current value Ib1 matches current reference values Ib1*. Similarly, current feedback unit 60-2 receives current reference values Ib2* and battery current value Ib2, and supplies a control output corresponding to a current deviation therebetween such that battery current value Ib2 matches current reference values Ib2*.

More specifically, current feedback unit 60-1 includes a subtraction unit 62-1, a proportional element 64-1, an integral element 66-1, and an addition unit 68-1.

Subtraction unit 62-1 computes the current deviation based on a difference between current reference values Ib1* and battery current value Ib1, and supplies an output to proportional element 64-1. Proportional element 64-1 has a proportional gain Kp1, multiples the output received from subtraction unit 62-1 by proportional gain Kp1, and supplies an output to integral element 66-1 and addition unit 68-1. Integral element 66-1 has an integral gain (integral time or reset time) Ti1, integrates the output received from proportional element 64-1 with respect to time, and supplies an output to addition unit 68-1. Addition unit 68-1 adds the two outputs received from proportional element 64-1 and integral element 66-1 to supply an output to voltage feedforward unit 70-1. That is, the control output supplied from current feedback unit 60-1 is represented by $Kp1 \times (1+1/sTi1) \times (Ib1^*-Ib1)$, where "s" indicates the Laplace variable.

On the other hand, current feedback unit 60-2 includes a subtraction unit 62-2, a proportional element 64-2, an integral element 66-2, and an addition unit 68-2. Since current feedback unit 60-2 is similar to current feedback unit 60-1 described above except that proportional element 64-2 has a proportional gain Kp2 and integral element 66-2 has an integral gain Ti2, the detailed description thereof will not be repeated.

Voltage feedforward unit 70-1 inverts the sign of the control output received from current feedback unit 60-1, and then adds battery voltage value Vb1/reference voltage value Vh* and outputs duty command Ton1. Similarly, voltage feedforward unit 70-2 inverts the sign of the control output received from current feedback unit 60-2, and then adds battery voltage value Vb2/reference voltage value Vh* and outputs duty command Ton2. Battery voltage value Vb1/reference voltage value Vh* and battery voltage value Vb2/reference voltage value Vh* correspond to the reciprocals of theoretical boost ratios in converters CONV1, CONV2, respectively.

More specifically, voltage feedforward unit 70-1 includes a division unit 74-1 and a subtraction unit 72-1. Division unit 74-1 divides battery voltage value Vb1 of power storage unit BAT1 by reference voltage value Vh*, and outputs the division result to subtraction unit 72-1. Subtraction unit 72-1 inverts the sign of the control output received from current feedback unit 60-1, adds the division result received from division unit 74-1, and supplies an output to modulation unit 58-1.

On the other hand, voltage feedforward unit 70-2 includes a division unit 74-2 and a subtraction unit 72-2. Since the operation of voltage feedforward unit 70-2 is similar to that of voltage feedforward unit 70-1, the detailed description thereof will not be repeated.

Modulation unit 58-1 compares duty command Ton1 received from voltage feedforward unit 70-1 with a carrier wave generated by an oscillation unit not shown, and generates switching command PWC1. Similarly, modulation unit 58-2 compares duty command Ton2 received from voltage feedforward unit 70-2 with the carrier wave generated by the oscillation unit not shown, and generates switching command PWC2. Duty commands Ton1, Ton2 are control commands defining on-duty of transistors Q1B, Q2B (FIG. 2) of converters CONV1, CONV2, respectively, determining boost ratios of converters CONV1, CONV2.

It is to be noted that, although control block 200 shown in FIG. 4 can also be implemented by configuring control unit 2 to include a circuit corresponding to each block, in many cases, control block 200 is implemented by control unit 2 executing a process routine in accordance with a preset program.

Hereinafter, with reference to FIGS. 4 and 5, a method of determining the control gains in proportional elements 64-1, 64-2 and integral elements 66-1, 66-2 contained in current feedback units 60-1, 60-2 described above, respectively, will be described in detail.

As to voltage feedback unit 50 commonly used to generate duty commands Ton1, Ton2, it is not possible to set a control gain separately for each of converters CONV1, CONV2. Further, although voltage feedforward units 70-1, 70-2 can determine initial values at the start of the control, they give no affect to a transient operation.

Therefore, to match transient changes in converters CONV1, CONV2 having response characteristics different from each other, it is necessary to appropriately set the control gains in current feedback units 60-1, 60-2 that temporally change duty commands Ton1, Ton2. Specifically, the control gains can be determined taking only current feedback units 60-1, 60-2 and converters CONV1, CONV2 into consideration.

Figure 5:
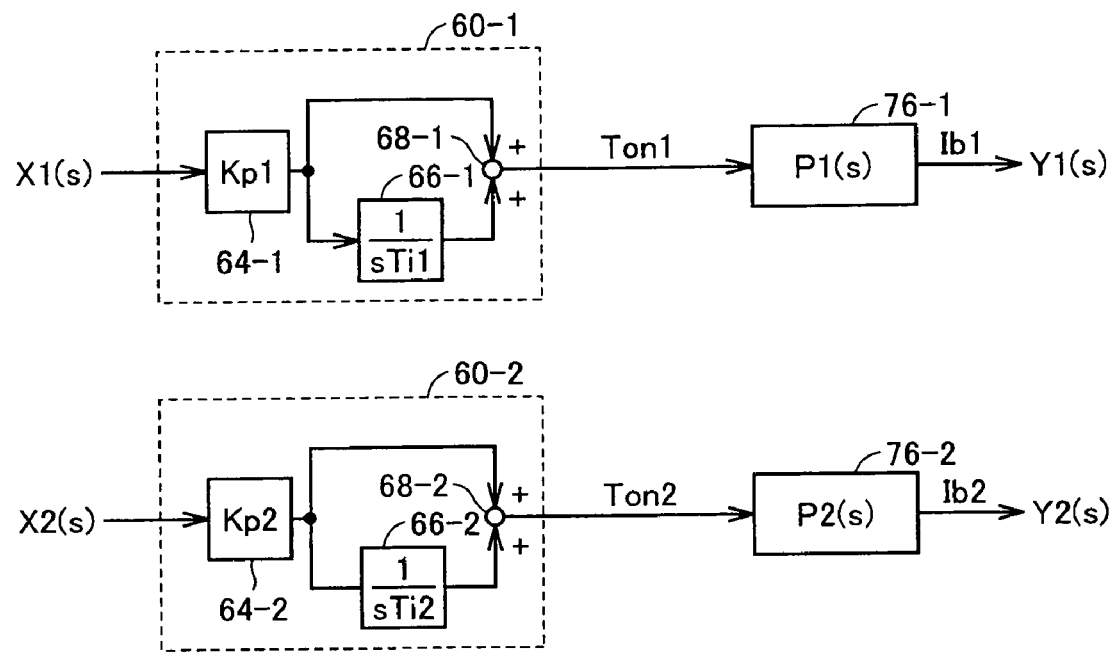
FIG. 5 is a view for illustrating an example of a method of determining control gains in current feedback units.

When it is assumed that control models 76-1, 76-2 having duty commands Ton1, Ton2 as inputs and battery current values Ib1, Ib2 as outputs, provided corresponding to converters CONV1, CONV2, have transfer functions P1($s$), P2($s$), respectively, control systems taking current feedback units 60-1, 60-2 and converters CONV1, CONV2 into consideration, respectively, are represented as shown in FIG. 5.

Then, in a case where the control systems have inputs X1($s$), X2($s$) and outputs Y1($s$), Y2($s$), respectively, transfer functions G1($s$), G2($s$) are represented as follows:

$$G1(s)=Y1(s)/X1(s)=Kp1\times(1+1/sTi1)\times P1(s),$$

$$G2(s)=Y2(s)/X2(s)=Kp2\times(1+1/sTi2)\times P2(s).$$

It is to be noted that control models 76-1, 76-2 can be modeled based on physical constants of the elements of chopper circuits 40-1, 40-2 (FIG. 2), switching cycles of modulation units 58-1, 58-2 (FIG. 3), delays in detection in battery current value detection units 10-1, 10-2 (FIG. 1), and the like.

Further, the control gains (proportional gains Kp1, Kp2 and integral gains Ti1, Ti2) are determined such that transfer functions G1($s$), G2($s$) described above substantially match with each other, with respect to delay elements. Specifically, the control gains are determined to satisfy the following relationship:

$$G1(s)\approx\alpha\times G2(s), \text{ that is,}$$

$$Kp1\times(1+1/sTi1)\times P1(s)\approx\alpha\times Kp2\times(1+1/sTi2)\times P2(s),$$

where $\alpha$ indicates a conversion constant. In particular, the control gains are determined such that terms related to a delay element $1/s$ (and/or $1/s^2, \ldots, 1/s^n$) have coefficients substantially identical to each other.

It is to be noted that conversion constant $\alpha$ is a value for compensating for (or standardizing) a difference in rated values of battery current values Ib1, Ib2 flowing from power storage units BAT1, BAT2 to converters CONV1, CONV2, and corresponds to a ratio between the rated values of battery current values Ib1, Ib2.

Specifically, when transfer functions Ps1($s$), Ps2($s$) in a case where a reference value (0-100%) standardized by a rated value is input are used, the control gains are determined to satisfy the following relationship:

$$Kp1\times(1+1/sTi1)\times Ps1(s)\approx Kp2\times(1+1/sTi2)\times Ps2(s).$$

By using the control gains determined as described above, time taken from when a step input (100% of the rated value) as a standard reference value is supplied to input X1($s$) to when an output value (battery current value Ib1) of transfer function G1($s$) in the time domain reaches a standard output value (for example, 63% of the rated value) can substantially match time taken from when the step input as the standard reference value is supplied to input X2($s$) to when an output value (battery current value Ib2) of transfer function G2($s$) in the time domain reaches the standard output value. By substantially matching response characteristics in the time domain of transfer functions G1($s$), G2($s$) with respect to inputs X1($s$), X2($s$), generation of a transient voltage difference between converters CONV1, CONV2 and the like can be avoided.

In the above description, a method of determining control gains for feedback control systems with no gain element inserted into feedback paths thereof so as to substantially match open loop transfer functions thereof has been described. However, when any gain element is inserted into feedback paths of target feedback control systems, control gains may be determined so as to substantially match closed loop transfer functions.

According to the first embodiment of the present invention, control gains in current feedback units are determined such that one transfer function including one of the current feedback units and a corresponding converter substantially matches the other transfer function, with respect to delay elements. Thereby, the current feedback units determining response characteristics of the converters during transition are implemented to compensate for a difference in the response characteristics of the converters, and thus response characteristics of output voltages of the converters substantially match with each other. Therefore, generation of a voltage difference between the converters during transition such as immediately after the start of control can be avoided, suppressing a circulation current between power storage units flowing through the converters. Consequently, a power supply system that suppresses an unwanted circulation current caused between a plurality of converters having voltage conversion capabilities different from each other and avoids damage to power storage units, and a vehicle including the power supply system can be implemented.

[Variation]

In the first embodiment of the present invention, the description has been given of the configuration in which converters CONV1 and CONV2 are controlled by a control system including a voltage feedback unit as a major loop and current feedback units as minor loops. In a variation of the first embodiment of the present invention, a description will be given of a configuration in which converters CONV1 and CONV2 are controlled by a control system including only voltage feedback units as feedback loops.

Since a target power supply system is the same as power supply system 1 shown in FIG. 1, the detailed description thereof will not be repeated.

Figure 6:
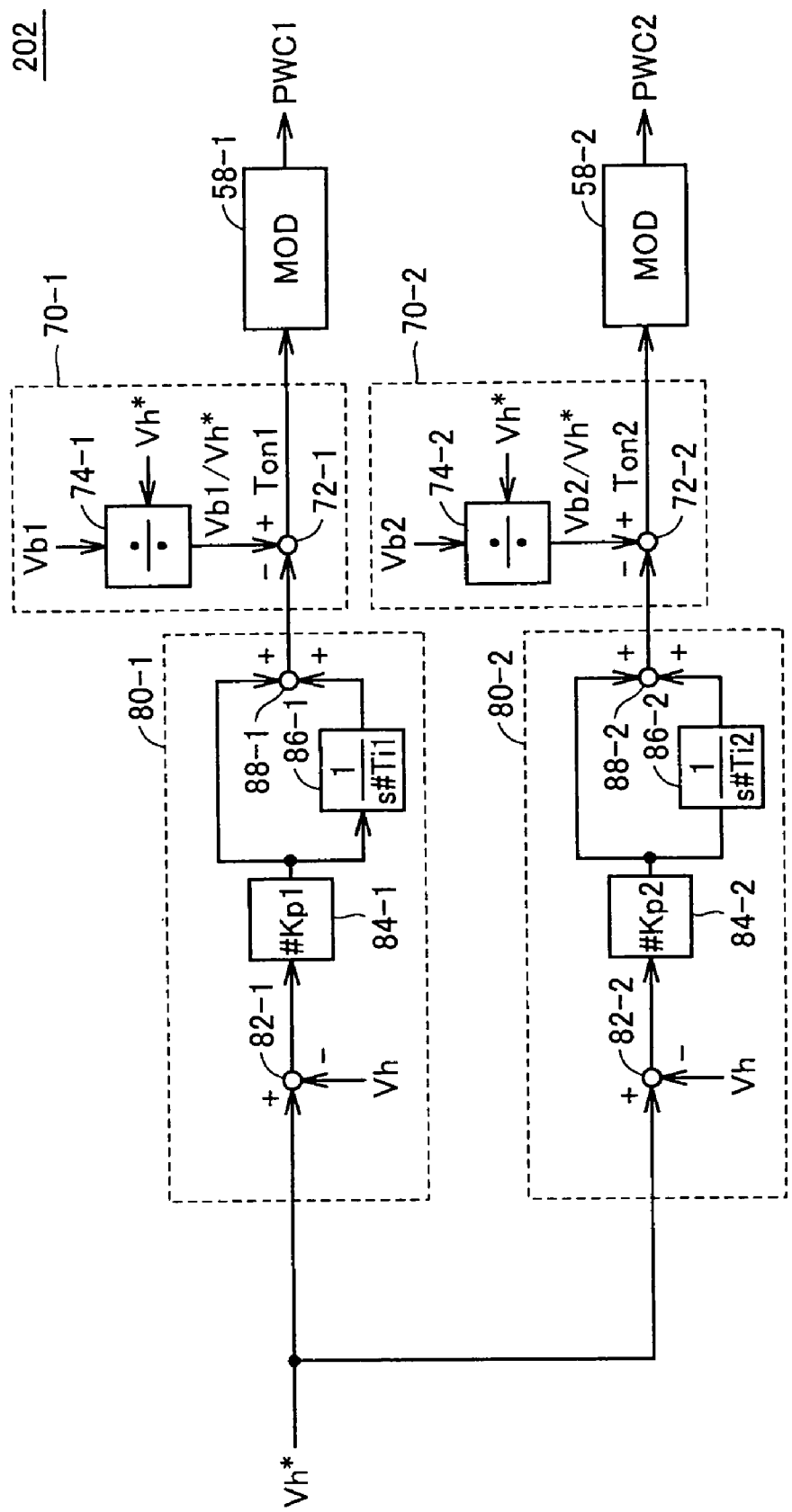
FIG. 6 is a view showing a control block for controlling a converter in accordance with a variation of the first embodiment of the present invention.

Referring to FIG. 6, a control block 202 for controlling converters CONV1, CONV2 in accordance with the variation of the first embodiment of the present invention will be described. Control block 202 includes voltage feedback units 80-1, 80-2 arranged instead of voltage feedback unit 50, division units 56-1, 56-2, and current feedback units 60-1, 60-2 in control block 200 shown in FIG. 4.

Voltage feedback units 80-1, 80-2 each receive reference voltage value Vh* and supply voltage value Vh, and supply a control output corresponding to a voltage deviation therebetween such that supply voltage value Vh matches reference voltage value Vh*. Specifically, voltage feedback unit 80-1 includes a subtraction unit 82-1, a proportional element 84-1, an integral element 86-1, and an addition unit 88-1.

Subtraction unit 82-1 computes the voltage deviation based on a difference between reference voltage value Vh* and supply voltage value Vh, and supplies an output to proportional element 84-1. Proportional element 84-1 has a proportional gain #Kp1, multiples the output received from subtraction unit 82-1 by proportional gain #Kp1, and supplies an output to integral element 86-1 and addition unit 88-1. Integral element 86-1 has an integral gain (integral time or reset time) #Ti1, integrates the output received from proportional element 84-1 with respect to time, and supplies an output to addition unit 88-1. Addition unit 88-1 adds the two outputs received from proportional element 84-1 and integral element 86-1 to supply an output to voltage feedforward unit 70-1. That is, the control output supplied from voltage feedback unit 80-1 is represented by #Kp1×(1+1/s#Ti1)×(Vh*−Vh), where "s" indicates the Laplace variable.

Similarly, voltage feedback unit 80-2 includes a subtraction unit 82-2, a proportional element 84-2, an integral element 86-2, and an addition unit 88-2. Since voltage feedback unit 80-2 is similar to voltage feedback unit 80-1 described above except that proportional element 84-2 has a proportional gain #Kp2 and integral element 86-2 has an integral gain #Ti2, the detailed description thereof will not be repeated.

As for the rest, the variation is the same as the first embodiment of the present invention described above, and thus the detailed description thereof will not be repeated.

Then, the control gains (proportional gains #Kp1, #Kp2 and integral gains #Ti1, #Ti2) in voltage feedback units 80-1, 80-2 are determined as in the first embodiment of the present invention described above. That is, the control gains in voltage feedback units 80-1, 80-2 are determined such that one transfer function including voltage feedback unit 80-1 and converter CONV1 substantially matches the other transfer function including voltage feedback unit 80-2 and converter CONV2, with respect to delay elements.

Since feedback loops associated with supply voltage value Vh are configured in the variation of the first embodiment of the present invention, transfer functions #P1(s), #P2(s) modeling converters CONV1, CONV2 are determined to have duty commands Ton1, Ton2 as inputs, respectively, and supply voltage value Vh as an output.

As for the rest, the variation is the same as the first embodiment of the present invention described above, and thus the detailed description thereof will not be repeated.

According to the variation of the first embodiment of the present invention, in addition to the effect obtained by the first embodiment of the present invention, a control structure can be simplified as it is configured by single feedback loops.

Second Embodiment

The present invention is applicable to a power supply system having three or more power storage units, in addition to the power supply system having two power storage units described above.

Figure 7:
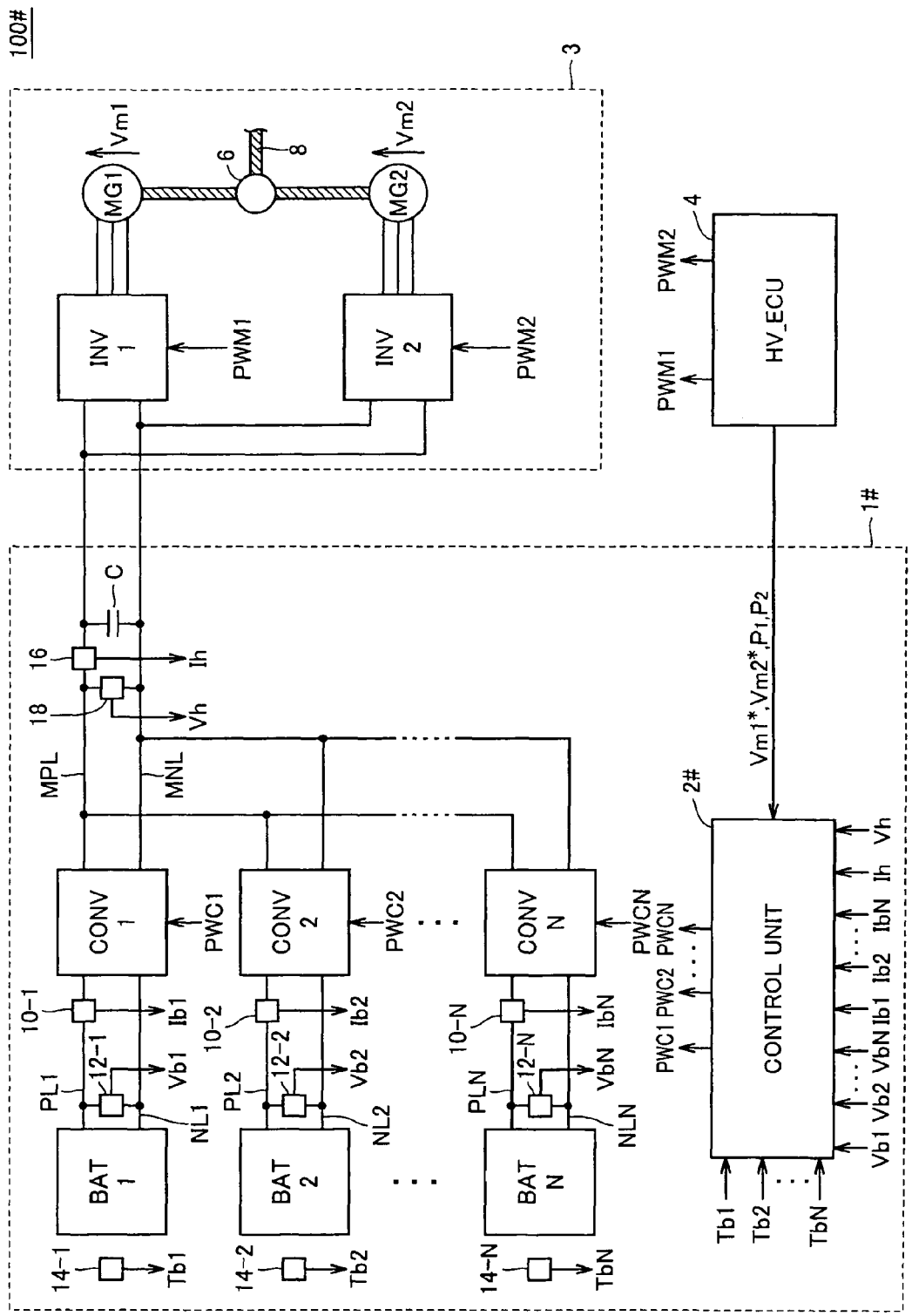
FIG. 7 is a schematic configuration diagram showing a substantial part of a vehicle including a power supply system in accordance with a second embodiment of the present invention.

Referring to FIG. 7, a vehicle 100# including a power supply system 1# in accordance with a second embodiment of the present invention will be described. Since vehicle 100# includes power supply system 1# arranged instead of power supply system 1 in vehicle 100 shown in FIG. 1, the detailed description of drive force generation unit 3 will not be repeated. In the second embodiment of the present invention, power supply system 1# including N power storage units will be described.

Power supply system 1# includes converters CONV1, CONV2, . . . , CONVN, power storage units BAT1, BAT2, . . . , BATN, battery current value detection units 10-1, 10-2, . . . , 10-N, battery voltage value detection units 12-1, 12-2, . . . , 12-N, and battery temperature detection units 14-1, 14-2, . . . , 14-N, arranged instead of converters CONV1, CONV2, power storage units BAT1, BAT2, battery current value detection units 10-1, 10-2, battery voltage value detection units 12-1, 12-2, and battery temperature detection units 14-1, 14-2 in power supply system 1 shown in FIG. 1, respectively. Further, power supply system 1# includes a control unit 2# arranged instead of control unit 2 in power supply system 1 shown in FIG. 1.

Converters CONV1 to CONVN are connected in parallel to main positive bus line MPL and main negative bus line MNL, and perform voltage conversion operation between respective power storage units BAT1 to BATN and main positive bus line MPL and main negative bus line MNL.

Power storage units BAT1 to BATN are connected in parallel to main positive bus line MPL and main negative bus line MNL through converters CONV1 to CONVN, respectively. In particular, in the second embodiment of the present invention, at least one of power storage units BAT1 to BATN has a battery capacity different from that of other power storage units.

Battery current value detection units 10-1 to 10-N, battery voltage value detection units 12-1 to 12-N, and battery temperature detection units 14-1 to 14-N are arranged in correspondence with power storage units BAT1 to BATN, respectively.

Control unit #2 generates duty commands Ton1 to TonN by a control system including a voltage feedback unit (main loop) setting the voltage conversion operation such that supply voltage value Vh, which is one of process values, matches reference voltage value Vh*, and N current feedback units (minor loops) causing the voltage conversion operation to be performed such that battery current values Ib1 to IbN match current reference values Ib1* to IbN*, respectively. Herein, reference voltage value Vh* is determined in accordance with required voltage values Vm1*, Vm2* received from HV_ECU 4. Further, the voltage feedback unit and the current feedback units constitute cascade control, and current reference values Ib1* to IbN* are each determined by the result of computation from the voltage feedback unit.

These N current feedback units are each configured to include a proportional element (P) and an integral element (I). Proportional gain Kp and integral gain Ti, which are control gains of the elements, are determined such that, in each of the current feedback units, it takes substantially the same amount of time from when a standard reference value (current reference value) is supplied to each current feedback unit to when a battery current value generated by the voltage conversion operation in the corresponding one of converters CONV1 to CONVN reaches a standard output value. To give a concrete example, proportional gain Kp and integral gain Ti serving as control gains of the elements are determined such that transfer functions including respective current feedback units and respective corresponding converters CONV1 to CONVN substantially match with one another, with respect to delay elements.

Further, the control system described above is configured to include voltage feedforward units adding values corresponding to ratios between reference voltage value Vh* and battery voltage values Vb1 to VbN of power storage units BAT1 to BATN, respectively (voltage conversion ratios).

As for the rest, vehicle 100# is the same as that in the first embodiment of the present invention described above, and thus the detailed description thereof will not be repeated.

As to the correspondence between FIG. 7 and the invention of the present application, drive force generation unit 3 corresponds to the "load device", main positive bus line MPL and main negative bus line MNL correspond to the "power line", and converters CONV1 to CONVN correspond to the "plurality of voltage conversion units." Further, battery current value detection units 10-1 to 10-N implement the "battery current value detection unit", supply voltage value detection unit 18 implements the "supply voltage value detection unit", and battery voltage value detection units 12-1 to 12-N implement the "battery voltage value detection unit".

Figure 8:
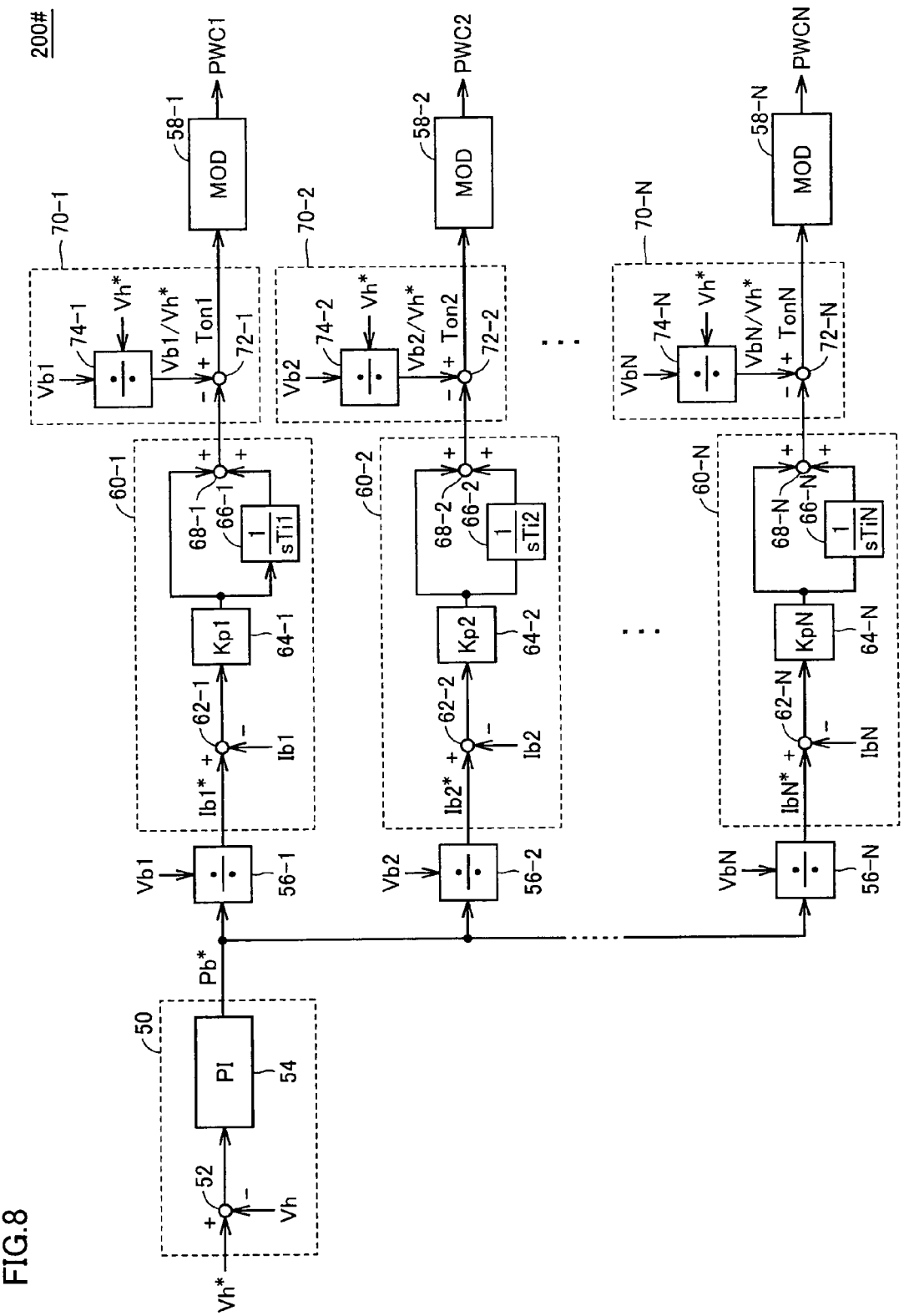
FIG. 8 is a view showing a control block for controlling a converter in accordance with the second embodiment of the present invention.

Referring to FIG. 8, a control block 200# for controlling converters CONV1 to CONVN in accordance with the second embodiment of the present invention will be described. Control block 200# is an extended version of control block 200 shown in FIG. 4, and includes division units 56-1 to 56-N, current feedback units 60-1 to 60-N, voltage feedforward units 70-1 to 70-N, and modulation units (MOD) 58-1 to 58-N, arranged instead of division units 56-1, 56-2, current feedback units 60-1, 60-2, voltage feedforward units 70-1, 70-2, and modulation units (MOD) 58-1, 58-2 in control block 200, respectively. As for the rest, control block 200# is the same as control block 200, and thus the detailed description thereof will not be repeated.

Then, the control gains (proportional gains Kp1 to KpN and integral gains Ti1 to TiN) in current feedback units 60-1 to 60-N are each determined as in the first embodiment of the present invention described above. That is, the control gains in current feedback units 60-1 to 60-N are determined such that transfer functions including the control gains of respective current feedback units 60-1 to 60-N and respective corresponding converters CONV1 to CONVN substantially match with one another, with respect to delay elements.

As for the rest, control block 200# is the same as that in the first embodiment of the present invention described above, and thus the detailed description thereof will not be repeated.

According to the second embodiment of the present invention, the effect similar to that in the first embodiment of the present invention can be obtained even when the power supply system includes three or more converters and power storage units. Thereby, the number of converters and power storage units can be designed relatively freely in accordance with a required electric power value of the load device. Therefore, a power supply system capable of supplying electric power to load devices of various sizes and types and a vehicle including the power supply system can be implemented.

[Variation]

As in the variation of the first embodiment of the present invention, a description will be given of a configuration in which converters CONV1 to CONVN are controlled by a control system including only voltage feedback units as feedback loops.

Since a target power supply system is the same as power supply system 1# shown in FIG. 7, the detailed description thereof will not be repeated.

Figure 9:
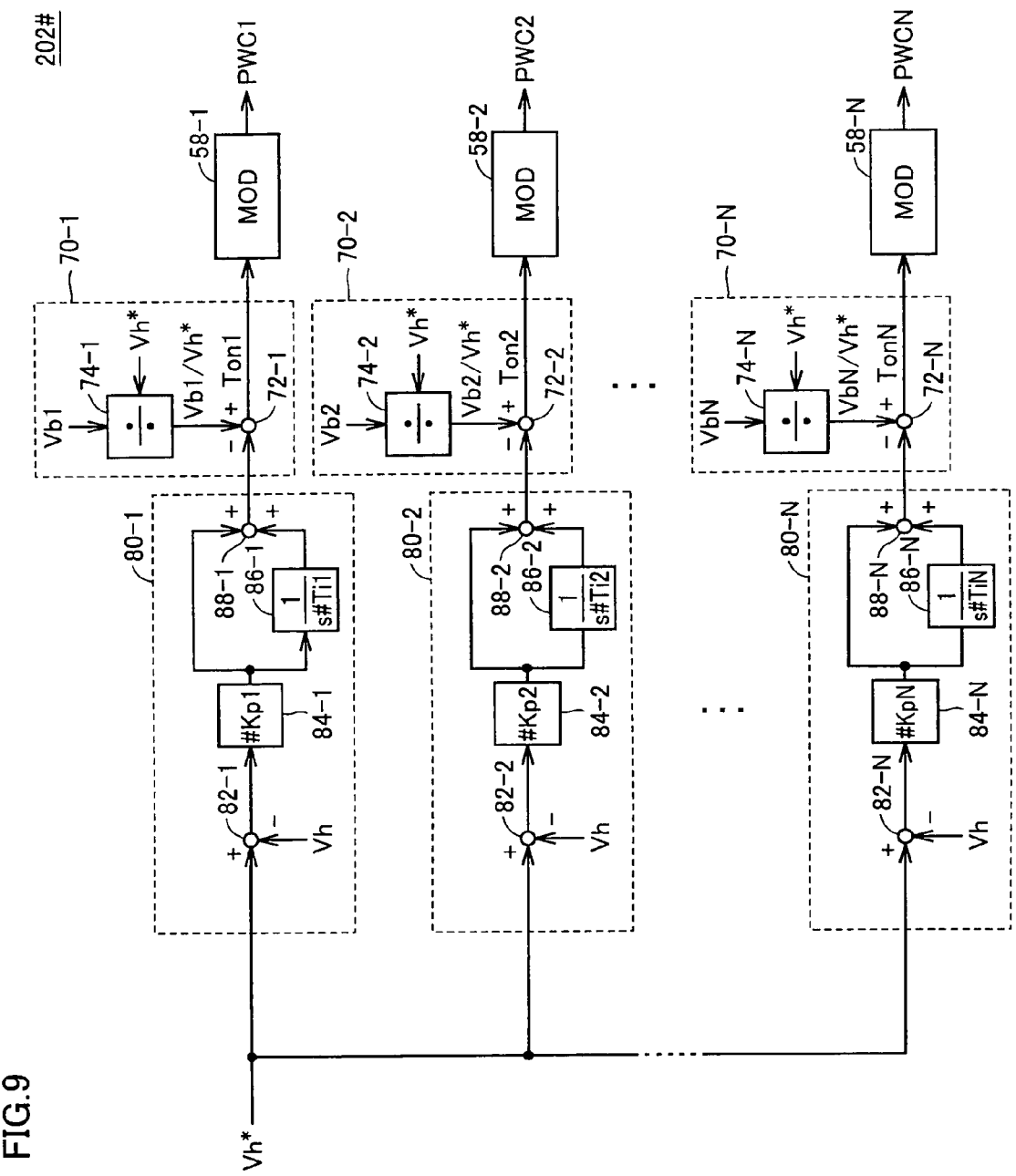
FIG. 9 is a view showing a control block for controlling a converter in accordance with a variation of the second embodiment of the present invention.

Referring to FIG. 9, a control block 202# for controlling converters CONV1 to CONVN in accordance with a variation of the second embodiment of the present invention will be described. Control block 202# is an extended version of control block 202 shown in FIG. 6, and includes voltage feedback units 80-1 to 80-N, voltage feedforward units 70-1 to 70-N, and modulation units (MOD) 58-1 to 58-N, arranged instead of voltage feedback units 80-1, 80-2, voltage feedforward units 70-1, 70-2, and modulation units (MOD) 58-1, 58-2 in control block 202, respectively. As for the rest, control block 202# is the same as control block 202, and thus the detailed description thereof will not be repeated.

Then, the control gains (proportional gains #Kp1 to #KpN and integral gains #Ti1 to #TiN) in voltage feedback units 80-1 to 80-N are each determined as in the variation of the first embodiment of the present invention described above. That is, the control gains in voltage feedback units 80-1 to 80-N are determined such that transfer functions including the control gains of respective voltage feedback units 80-1 to 80-N and respective corresponding converters CONV1 to CONVN substantially match with one another, with respect to delay elements.

As for the rest, the variation is the same as the variation of the first embodiment of the present invention described above, and thus the detailed description thereof will not be repeated.

According to the variation of the second embodiment of the present invention, in addition to the effect obtained by the second embodiment of the present invention, a control structure can be simplified as it is configured by single feedback loops.

In the first and second embodiments of the present invention and the variations thereof, the description has been given of the configuration employing a drive force generation unit including two motor-generators, as an example of the load device. However, the number of motor-generators is not limited. In addition, the load device is not limited to a drive force generation unit generating drive force for a vehicle, and the present invention is applicable to a device only consuming electric power as well as to a device capable of consuming and generating electric power.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power supply system having a plurality of power storage units each configured to be chargeable/dischargeable, comprising:

a power line configured to allow supply/reception of electric power between a load device and said power supply system;

a plurality of voltage conversion units provided between said plurality of power storage units and said power line, respectively, and each performing voltage conversion operation between corresponding said power storage unit and said power line; and a battery current value detection unit detecting a battery current value of each of said plurality of power storage units, at least one of said plurality of voltage conversion units having voltage conversion capability different from that of other of said plurality of voltage conversion units, each of said plurality of voltage conversion units being controlled by a control system including a first feedback unit performing said voltage conversion operation such that the battery current value of corresponding said power storage unit matches a reference current value, the control system includes a voltage feedforward unit causing a value based on a battery voltage value, taken between corresponding said power storage unit and said voltage conversion unit, and a reference voltage value to be reflected in an output of said first feedback unit, a control gain in said first feedback unit being determined such that time taken from when a standard reference value is applied to said first feedback unit to when a current value generated by said voltage conversion operation in corresponding said voltage conversion unit reaches a standard output value substantially matches time taken from when the standard reference value is applied to another said first feedback unit to when a current value generated by said voltage conversion operation in corresponding another said voltage conversion unit reaches the standard output value.

2. The power supply system according to claim 1, wherein the control gain in said first feedback unit is determined such that a transfer function including said first feedback unit and corresponding said voltage conversion unit substantially matches a transfer function including said other first feedback unit and corresponding said other voltage conversion unit, with respect to delay elements.

3. The power supply system according to claim 1, further comprising a supply voltage value detection unit detecting a voltage value on said power line,
wherein said reference current value is determined by a second feedback unit, said second feedback unit setting said voltage conversion operation such that the voltage value on said power line detected by said supply voltage value detection unit matches said reference voltage value.

4. The power supply system according to claim 3, wherein said voltage feedforward unit causes a value corresponding to a ratio between said battery voltage value of corresponding said power storage unit and said reference voltage value to be reflected in said output of said first feedback unit.

5. The power supply system according to claim 1, wherein each of said plurality of voltage conversion units includes a chopper circuit.

6. A vehicle, comprising:
a power supply system having a plurality of power storage units each configured to be chargeable/dischargeable; and
a drive force generation unit receiving electric power supplied from said power supply system to generate drive force,
said power supply system including:
a power line configured to allow supply/reception of electric power between said drive force generation unit and said power supply system;
a plurality of voltage conversion units provided between said plurality of power storage units and said power line, respectively, and each performing voltage conversion operation between corresponding said power storage unit and said power line; and
a battery current value detection unit detecting a battery current value of each of said plurality of power storage units,
at least one of said plurality of voltage conversion units having voltage conversion capability different from that of other of said plurality of voltage conversion units,
each of said plurality of voltage conversion units being controlled by a control system including a first feedback unit performing said voltage conversion operation such that the battery current value of corresponding said power storage unit matches a reference current value, the control system includes a voltage feedforward unit causing a value based on a battery voltage value, taken between corresponding said power storage unit and said voltage conversion unit, and a reference voltage value to be reflected in an output of said first feedback unit,
a control gain in said first feedback unit being determined such that time taken from when a standard reference value is applied to said first feedback unit to when a current value generated by said voltage conversion operation in corresponding said voltage conversion unit reaches a standard output value substantially matches time taken from when the standard reference value is applied to another said first feedback unit to when a current value generated by said voltage conversion operation in corresponding another said voltage conversion unit reaches the standard output value.

7. The vehicle according to claim 6, wherein said drive force generation unit includes:
at least one power conversion unit configured to be capable of converting the electric power supplied from said power supply system, and
at least one electric rotating machine connected to corresponding said power conversion unit and configured to be capable of generating said drive force.

8. The vehicle according to claim 6, wherein the control gain in said first feedback unit is determined such that a transfer function including said first feedback unit and corresponding said voltage conversion unit substantially matches a transfer function including said other first feedback unit and corresponding said other voltage conversion unit, with respect to delay elements.

9. The vehicle according to claim 6, wherein
said power supply system further includes a supply voltage value detection unit detecting a voltage value on said power line, and
said reference current value is determined by a second feedback unit, said second feedback unit setting said voltage conversion operation such that the voltage value on said power line detected by said supply voltage value detection unit matches said reference voltage value.

10. The vehicle according to claim 9, wherein said voltage feedforward unit causes a value corresponding to a ratio between a battery voltage value of corresponding said power storage unit and said reference voltage value to be reflected in said output of said first feedback unit.

11. The vehicle according to claim 6, wherein each of said plurality of voltage conversion units includes a chopper circuit.

12. A power supply system having a plurality of power storage units each configured to be chargeable/dischargeable, comprising:
a power line configured to allow supply/reception of electric power between a load device and said power supply system;
a plurality of voltage conversion units provided between said plurality of power storage units and said power line, respectively, and each performing voltage conversion operation between corresponding said power storage unit and said power line; and
a supply voltage value detection unit detecting a voltage value on said power line,
at least one of said plurality of voltage conversion units having voltage conversion capability different from that of other of said plurality of voltage conversion units,
each of said plurality of voltage conversion units being controlled by a control system including a first feedback unit performing said voltage conversion operation such that the voltage value on said power line detected by said supply voltage value detection unit matches a reference voltage value, the control system includes a voltage feedforward unit causing a value based on a battery voltage value, taken between corresponding said power storage unit and said voltage conversion unit, and a reference voltage value to be reflected in an output of said first feedback unit, a control gain in said first feedback unit being determined such that time taken from when a standard reference value is applied to said first feedback unit to when a voltage value generated by said voltage conversion operation in corresponding said voltage conversion unit reaches a standard output value substantially matches time taken from when the standard reference value is applied to another said first feedback unit to when a voltage value generated by said voltage conversion operation in corresponding another said voltage conversion unit reaches the standard output value.

13. The power supply system according to claim 12, wherein the control gain in said first feedback unit is determined such that a transfer function including said first feedback unit and corresponding said voltage conversion unit substantially matches a transfer function including said other first feedback unit and corresponding said other voltage conversion unit, with respect to delay elements.

14. The power supply system according to claim 13, wherein said voltage feedforward unit causes a value corresponding to a ratio between said battery voltage value of corresponding said power storage unit and said reference voltage value to be reflected in said output of said first feedback unit.

15. The power supply system according to claim 12, wherein each of said plurality of voltage conversion units includes a chopper circuit.

16. A vehicle, comprising:
a power supply system having a plurality of power storage units each configured to be chargeable/dischargeable; and
a drive force generation unit receiving electric power supplied from said power supply system to generate drive force,
said power supply system including:
a power line configured to allow supply/reception of electric power between said drive force generation unit and said power supply system;
a plurality of voltage conversion units provided between said plurality of power storage units and said power line, respectively, and each performing voltage conversion operation between corresponding said power storage unit and said power line; and
a supply voltage value detection unit detecting a voltage value on said power line,
at least one of said plurality of voltage conversion units having voltage conversion capability different from that of other of said plurality of voltage conversion units,
each of said plurality of voltage conversion units being controlled by a control system including a first feedback unit performing said voltage conversion operation such that the voltage value on said power line detected by said supply voltage value detection unit matches a reference voltage value, the control system includes a voltage feedforward unit causing a value based on a battery voltage value, taken between corresponding said power storage unit and said voltage conversion unit, and a reference voltage value to be reflected in an output of said first feedback unit;
a control gain in said first feedback unit being determined such that time taken from when a standard reference value is applied to said first feedback unit to when a voltage value generated by said voltage conversion operation in corresponding said voltage conversion unit reaches a standard output value substantially matches time taken from when the standard reference value is applied to another said first feedback unit to when a voltage value generated by said voltage conversion operation in corresponding another said voltage conversion unit reaches the standard output value.

17. The vehicle according to claim 16, wherein said drive force generation unit includes:
at least one power conversion unit configured to be capable of converting the electric power supplied from said power supply system, and
at least one electric rotating machine connected to corresponding said power conversion unit and configured to be capable of generating said drive force.

18. The vehicle according to claim 16, wherein the control gain in said first feedback unit is determined such that a transfer function including said first feedback unit and corresponding said voltage conversion unit substantially matches a transfer function including said other first feedback unit and corresponding said other voltage conversion unit, with respect to delay elements.

19. The vehicle according to claim 18, wherein said voltage feedforward unit causes a value corresponding to a ratio between said battery voltage value of corresponding said power storage unit and said reference voltage value to be reflected in said output of said first feedback unit.

20. The vehicle according to claim 16, wherein each of said plurality of voltage conversion units includes a chopper circuit.

* * * * *